United States Patent [19]

Nield et al.

[11] Patent Number: 5,075,136
[45] Date of Patent: Dec. 24, 1991

[54] MAKING A THIN (>30PM) POLYPROPYLENE COATING BY APPLYING SMALL POLYPROPYLENE PARTICLES WITH ZONES OF AMORPHOUS POLYPROPYLENE CONTAINING ENTRAPPED MODERATE SOLVENT AND HEATING

[75] Inventors: Eric Nield, Beaconsfield; Daljit K. Suemul, Birmingham, both of United Kingdom

[73] Assignee: Imperial Chemical Industries PLC, London, United Kingdom

[21] Appl. No.: 453,300

[22] Filed: Dec. 22, 1989

[30] Foreign Application Priority Data

Dec. 23, 1988 [GB] United Kingdom ................. 8830073

[51] Int. Cl.$^5$ .............................................. B05D 3/02
[52] U.S. Cl. .................................... 427/175; 427/375; 427/385.5; 427/398.3
[58] Field of Search ..................... 427/375, 385.5, 336, 427/195, 398.3; 524/583; 528/498; 526/351

[56] References Cited

U.S. PATENT DOCUMENTS

| 3,135,622 | 6/1964 | Ranolli | 427/434.2 |
| 3,664,981 | 5/1972 | Mahlman | 524/583 |
| 3,971,749 | 7/1976 | Blunt | 524/583 |
| 4,156,672 | 5/1979 | Fitko et al. | 524/583 |

FOREIGN PATENT DOCUMENTS 1489501 10/1977 United Kingdom .

OTHER PUBLICATIONS

Cowie, J. M. G., "Polymers: Chemistry and Physics of Modern Materials", pp. 194–198, 1973.

Primary Examiner—Shrive Beck
Assistant Examiner—Benjamin L. Utech
Attorney, Agent, or Firm—Cushman, Darby & Cushman

[57] ABSTRACT

A process for the application of a thin crystalline polypropylene coating to a surface which employs partially crystalline polypropylene particles which comprise zones of amorphous polypropylene containing entrapped moderate solvent. When heated particles flow and coalesce better than conventional polypropylene particles and so allow thinner coatings to be obtained. Also articles to which the coatings have been applied.

8 Claims, No Drawings

MAKING A THIN (>30PM) POLYPROPYLENE COATING BY APPLYING SMALL POLYPROPYLENE PARTICLES WITH ZONES OF AMORPHOUS POLYPROPYLENE CONTAINING ENTRAPPED MODERATE SOLVENT AND HEATING

This invention relates to a process for the application of a thin crystalline polypropylene coating to a surface.

Crystalline polypropylenes include isotactic homopolymers of propylene and copolymers of propylene with up to 15 wt% ethylene and also polypropylenes modified by the presence of additives (for example rubbers, atactic polypropylenes or grafted carboxylic moieties). Crystalline isotactic polypropylenes are well known thermoplastics. They usually have a crystallinity of 30 to 70%. A fuller description of the various types of polypropylene is given in Volume 16 of the third edition of Kirk-Othmer's "Encyclopaedia of Chemical Technology" published by John Wiley & Sons of New York in 1981 (see pages 453 to 467) the contents of which are herein incorporated by reference.

Polypropylene is a cheap, inert, non-toxic material which would provide useful thin protective coatings if a suitable application technique could be devised. For many years now, polypropylene has been available in the form of particles which have been used in powder coating processes to provide surface coatings. However the usefulness of the processes have been limited by the coarseness and the irregularity of the particles sizes and by the inherent vulnerability of polypropylene to thermal degradation and its high melt viscosity which together have prevented the achievement of coatings as thin as 30μm (1μm is $10^{-6}$m) and this in turn has meant that polypropylene has not been able to compete with polyvinyl chloride organosols in such areas as foil or can coating.

British patent specification GB 1 489 501 and French patent specification FR 2 588 263 both disclose techniques for obtaining finer more regular polypropylene particles by precipitating polypropylene from an organic solution and then washing the particles to remove residual organic solvent. The particles are more suitable for use in a variety of applications including the coating of surfaces but they still remain vulnerable to thermal degradation and have high melt viscosity which prevents thin film formation.

An object of this invention is to provide a process for the application of polypropylene coatings having a thickness of less than 30μm and especially less than 20μm.

Accordingly this invention provides a process for the application of a thin crystalline polypropylene coating to a surface which process comprises
a) providing across the surface a covering of a coating composition comprising particles of polypropylene which preferably have a number average diameter of from 1 to 30μm and
b) heating the composition to convert the particles into a coherent film
wherein
c) the particles comprise zones of amorphous polypropylene containing entrapped moderate solvent which solvent has the ability to depress by up to 80° C. the crystalline melting point (Tm) of the polypropylene when in a mixture consisting of 80wt% of the solvent and 20wt% of the polypropylene
whereby on heating the composition and subsequently cooling, a solid coating having a thickness of less than 30μm (preferably less than 20μm) can be obtained. It is believed that the presence of entrapped moderate solvent within the fine particles promotes fluidity during the heating of the coating composition allowing the formation of very thin coatings. The composition may comprise the particles alone or the particles may be present together with a liquid which does not destroy them at room temperature (for example a non-solvent for polypropylene or excess moderate solvent) so as to give a paste or dispersion. After heating, the coating undergoes cooling, for example by being allowed to cool to room temperature or by forced cooling including quenching by immersion into cold (i.e. less than 50° C.) water. Quenching produces a coating which is more glossy and/or more transparent and/or more ductile.

Crystalline melting point is determined by differential scanning calorimetry performed in turn on the polypropylene alone and on the above mixture. The mixture must be contained in a sealed capsule to prevent loss of the moderate solvent during heating. More particularly, 10mg of polypropylene alone and 10mg of mixture are each in turn subjected to cycles of heating and cooling performed under nitrogen in the calorimeter. Each heating/cooling cycle comprises heating the sample under test (which may be polypropylene alone or a mixture) at a rate of 20° C./min to cause crystalline melting which occurs at a temperature $T_m$, subsequently holding the sample for two minutes at a holding temperature $T_h$ which is above $T_m$, then cooling at a rate of 20° C./min to cause recrystallisation which occurs at a temperature $T_c$ and finally continuing cooling to a temperature of at least 10° C. below $T_c$. $T_m$ and $T_c$ are detected respectively as an endothermic trough and an exothermic peak in the graph of heat absorbed or evolved versus temperature. Each cycle is repeated to discover whether a consistent value for $T_c$ can be obtained. If consistency is not obtained, another pair of heating/cooling cycles are performed using a slightly higher $T_h$. Further pairs of cycles with gradually increasing $T_h$ are performed until consistent values for $T_c$ are achieved whereupon the pair of cycles which gave consistent values is repeated and the value for $T_m$ obtained is defined to be the crystalline melting point of the sample under test. A good solvent for propylene homopolymer depresses the melting point by well in excess of 80° C. whereas a moderate solvent such as the mixture of aliphatic hydrocarbons having a boiling point of 200° to 240° C. at 1 bar and available as "Exxol" D200/240 from Esso Chemicals Ltd depresses the melting point by only 48° C. ("Exxol" D200/240 is a mixture of aliphatic hydrocarbons having a boiling point of 200° to 240° C. at 1 bar).

Preferably the composition applied to the surface comprises 5 to 35 (especially 10 to 25) wt% of polypropylene and 95 to 65 wt% of moderate solvent where the percentage is based on the combined weight of the polypropylene and moderate solvent. Preferably the particles are heated to a temperature of from 180° to 220° C. for a period of from 2 to 30 minutes during which time the particles are converted into a thin coherent coating and the moderate solvent is removed by volatilization.

It may also be useful to add to the composition an auxiliary solvent which has a high boiling point at 1 bar absolute and which has a dissolving effect on the particles at a temperature above 160° C. (preferably above 180° C.). The boiling point of the auxiliary solvent should be sufficiently higher (preferably at least 100° C. higher) than that of the moderate solvent to ensure that during performance of the coating process, the auxiliary solvent remains in contact with the particles for a short period of time after the moderate solvent has been removed by volatilisaion so as to promote improved cohesion of the particles. Di-octyl phthalate (boiling point 340° C.) is a useful auxiliary liquid. Preferably up to 25 wt% (based on the combined weight of particles and moderate solvent) of auxiliary solvent is used.

The surfaces to which the coating may be applied may be metal for example aluminium, stainless steel or non-metallic, for example wood, paper, glass or textile. In particular the compositions may be used to coat paper, textile or metal sheets (including sheets which are subsequently formed for example into cans) and shaped articles such as cans using conventional liquid coating operations. The compositions may also be used to impregnate continuous rovings of a wide variety of fibres including glass and carbon fibres.

Particles for coating compositions suitable for use in this invention may be made by a method which comprises a) heating a mixture comprising the moderate solvent for the polypropylene and at least 5 (preferably 10 to 60) wt% of the polypropylene (the percentage being based on the combined weights of the moderate solvent and the polypropylene) to a temperature above the crystalline melting point ($T_m$) of the polypropylene when in the mixture and preferably to a temperature in the range $T_m + 10°$ C. to $T_m + 90°$ C. and b) cooling the heated mixture under conditions such that solid/liquid phase separation occurs whereupon there is produced a dispersion in moderate solvent of distinct particles of polypropylene comprising zones of amorphous polymer containing entrapped moderate solvent.

Usually the particles have a number average diameter of from 0.1 to 25μm. Preferably the mixture should be heated at least to its clearing temperature "$T_{cl}$". The "clearing temperature" ($T_{cl}$) of any chosen mixture comprising moderate solvent and polypropylene is the temperature at which the appearance of the mixture becomes clear to the unaided eye. $T_{cl}$ is determined by heating 2g of a chosen mixture until the polypropylene dissolves and the initially turbid solution obtained turns clear for a first time, then cooling the mixture to room temperature and finally re heating the mixture until it turns clear for the second time. The temperature at which it turns clear for the second time is defined to be the clearing temperature ($T_{cl}$) for that mixture. Heating to $T_{cl}$ and above (preferably to 10° to 30° C. above $T_{cl}$) leads to the formation of more uniform particle sizes. Uniformity of particle size is also enhanced by heating the mixture to a holding temperature $T_h$ which is above $T_m$ for the polypropylene when in the mixture (and preferably 10° to 40° C. above) and holding the mixture at temperature $T_h$ for from 1 to 30 minutes although holding for 1 to 5 minutes is usually sufficient.

It has been found that some large pellets of polypropylenes available commercially can be inconveniently slow to dissolve. Where time saving is important, this problem can be alleviated by using a pre-heating and pre-cooling cycle as follows. The mixture is first pre-heated to a temperature above the melting point of the pure polypropylene, for example to 220° C. Such pre-heating causes a rapid dissolution of the polypropylene.

The mixture is then pre-cooled to at least a temperature (for example 30° to 80° C. below the melting point of the pure polymer or lower) so that polypropylene re-solidifies from the mixture. Such re-solidification produces polypropylene in a form which dissolves quickly (usually within 2 minutes) on heating to $T_m$ or above so producing a mixture consisting of a solution of polypropylene in moderate solvent which appears clear to the unaided eye.

It is essential to employ conditions which cause solid/liquid phase separation to occur from the mixture when it is in its solution state for otherwise an agglomerated mass will be obtained. To achieve solid/liquid phase separation, it is necessary to use a moderate solvent, to use a mixture containing at least 5 wt% of polypropylene and to avoid shock cooling which usually means cooling at a rate of no faster than 300° C./min. The preferred cooling rates are from 10° C./min to 50° C./min.

One convenient method for introducing polypropylene to the moderate solvent comprises feeding both of them to a closed shearing mixer such as a Banbury or an extruder where they undergo heating to dissolve the polypropylene. The hot solution is then removed from the mixer and on cooling phase separation occurs to produce particles of polypropylene comprising zones of amorphous polymer containing entrapped moderate solvent. These particles (optionally with further liquid added) may then be used as a coating composition and in particular they be fed to an extruder fitted with a film-defining slit die for use in a conventional extrusion coating process.

Magnitude and uniformity of particle size may be controlled by the addition of nucleants (nucleating agents) to the moderate solvent from which the polypropylene phase separates. The nucleating agent is a material which raises the temperature at which crystallization of the polypropylene occurs. Preferred nucleants include sodium benzoate, dibenzylidene sobitol and talc.

Preferably any polypropylene used in a coating process should contain stabilizing systems to minimise degradation. Suitable systems comprise conventional hindered phenols such as 1,1,3-tris (2'-methyl-4'-hydroxy-5'-tertiary butylphenyl) butane (available as "Topanol" CA from Imperial Chemical Industries PLC) or penta-erythritol tetrakis (3,5-ditertiarybutyl-4-hydroxyphenyl propanate) available as "Irganox" 1010 from CIBA-Geigy and which are conventionally used with synergizing compounds which minimise thermal degradation such as dilauryl or distearyl thiodipropionate. ["Topanol" CA is hindered phenol, 1,1,3-tris(2'-methyl-4'-hydroxy-5'-tertiary butylphenyl) butane. "Irganox" 1010 is a hindered phenol, pentaerythritol tetrakis (3,5-ditertiarybutyl-4-hydroxyphenyl propanate)]. The polypropylene may also contain other additives such as stabilizers which minimise degradation by ultra violet light and pigments. Additives may be incorporated into the polypropylene by the supplier or they may be added to the solution of polypropylene so that they associate with the particle during phase separation.

The invention is further illustrated by the following Examples.

EXAMPLES 1 TO 8

Making the Compositions:

10g samples of a polypropylene (PP) and a copolymer of propylene with 5 wt% ethylene (PP(E)) were each mixed with a moderate solvent in amounts all as specified in Table 1. The polypropylene used in Examples 1 to 5 was available from Imperial Chemical Industries PLC as "Propathene" GWE 26 and that used in Example 6 was likewise available as "Propathene" GWE 24. The propylene copolymer used in Examples 7 and 8 was available as "Propathene" GWM 101. ("Propathene" GWE 26 and "Propathene" GWE 24 are polypropylenes having a melt flow index of 3 as determined by BS 2782 720A using a 2.16 kg load at 230° C. "Propathene" GW M 101 is a copolymer of propylene with 5% by weight of ethylene having a melt flow index of 4 as determined by BS 2782720A using a 2.16 kg load at 230° C.) The polypropylene and propylene copolymer had melt flow indexes as determined by BS 2782 720A using a 2.16kg load at 230° C. of 3 and 4 respectively. Each mixture was subjected to a double pre-heating/pre cooling cycle and then heated to a temperature above the crystalline melting point of the polymer when in the solvent and also above the clearing temperature for the mixture. The mixture was then allowed to cool to room temperature. The temperatures reached in these heating cycles are given in Table 2. Heating caused the polymer to dissolve completely. At least the last cooling caused a solid/liquid phase separation and a re-crystallisation of the polymer which produced a composition comprising moderate solvent in which was dispersed fine, distinct and approximately spherical partially crystalline polymer particles comprising amorphous zones containing entrapped moderate solvent. The particles comprised about 50 wt% of entrapped solvent. As determined by optical microscopy, the polypropylene particles obtained from GWE 26 had typical sizes of about 100μm, those obtained from GWE 24 had a typical size of 60μm and the copolymer particles had typical sizes of about 75 to 100μm.

TABLE 1

| Eg | Solvent | Type of polymer | Amount Polymer in Mixture, wt % |
| --- | --- | --- | --- |
| 1 | Decane | PP | 10 |
| 2 | " | " | 30 |
| 3 | *"Isopar" G | " | 10 |
| 4 | " | " | 30 |
| 5 | *"Exxol" 200/240 | " | 10 |
| 6 | " | " | 20 |
| 7 | Decahydro naphthalene | PP(E) | 10 |
| 8 | Decahydro naphthalene | " | 30 |

*Isopar G is a mixture of isoparaffins having a boiling point of from 155 to 175° C. at 1 bar and available from Esso Chemicals Ltd.
*"Exxol" 200/240 is a mixture of aliphatic hydrocarbons having a boiling point of from 204 to 245° C. at 1 bar and available from Esso Chemicals Ltd.

TABLE 2

| | HEATING CYCLES | | | | |
| --- | --- | --- | --- | --- | --- |
| PP or PP(E) | 1st Pre-Heat to °C. | Cool to °C. | 2nd Pre-heat to °C. | Cool to °C. | Heat to °C. |
| PP Examples 1 to 5 | 220 | 30 | 220 | 30 | 100 |
| PP Example 6 | 196 | RT | 196 | RT | 196 |

TABLE 2-continued

| | HEATING CYCLES | | | | |
| --- | --- | --- | --- | --- | --- |
| PP or PP(E) | 1st Pre-Heat to °C. | Cool to °C. | 2nd Pre-heat to °C. | Cool to °C. | Heat to °C. |
| PP(E) | 220 | RT | 180 | RT | 140 |

RT means room temperature.

EXAMPLES 9 TO 22

Making Nucleated Polypropylene Compositions

Compositions comprising nucleated polypropylene particles were made by adding various amounts of nucleants (as specified in Table 3) to the moderate solvent and then following the procedure of Example 1 except that in Example 22 the moderate solvent used was "Solvesso" 150 which is supplied by Esso Chemicals Limited and is an aromatic hydrocarbon having an initial boiling point of 188° C. at 1 bar absolute. Again the compositions obtained comprised moderate solvent in which was dispersed fine, distinct partially crystalline polypropylene particles having particle sizes as shown in Table 3 and comprising amorphous zones containing entrapped moderate solvent.

TABLE 3

| Example | Amount of PP in the Composition wt % | Nucleant | Amount Nucleant in the Composition wt % | Particle size μm |
| --- | --- | --- | --- | --- |
| 9 | 10 | Sodium benzoate | 0.3 | 10 to 12 |
| 10 | 20 | " | 0.3 | 12 to 15 |
| 11 | 30 | " | 0.3 | 5 to 8 |
| 12 | 40 | " | 0.3 | 10 to 30 |
| 13 | 50 | " | 0.3 | 12 to 25 |
| 14 | 30 | " | 1.0 | 2 to 8 |
| 15 | 30 | DBS | 0.3 | below 2 |
| 16 | 30 | DBS | 1.0 | 1 to 2 |
| 17 | 20 | DBS | 1.0 | 3 to 15 |
| 18 | 20 | Talc | 1.0 | 1 to 12 |
| 19 | 30 | DMBS | 1.0 | 1 to 2 |
| 20 | 30 | DEBS | 1.0 | 1 to 2 |
| 21 | 30 | Witco organic phosphate | 1.0 | 5 |
| *22 | 20 | DBS | 1.0 | <2 |

DBS is dibenzylidene sorbitol
DMBS is dimethyl benzylidene sorbitol
DEBS is diethylbenzylidene sorbitol
*Solvent was "Solvesso" 150.

EXAMPLES 23 AND 24

Application of the Compositions:

Compositions were each applied to flat smooth sheets using a Meyer doctoring bar comprising a cylindrical metal bar of diameter 9 mm around which is helically wound a single layer of a wire of diameter 0.8 mm with its adjacent helices contiguous throughout their length. In this way the bar is provided with a series of circumferential parallel grooves each 400 μm deep. To apply a coating, the bar is placed on the sheet whereupon the flat face of the sheet and the curvarture of the bar combine to define a nip into which the composition to be applied is delivered. The bar is then drawn across the sheet leaving a trail of parallel ridges of the composition. Di-octyl phthalate was added to compositions obtained from Examples 6 and 17 until the composition contained 17wt% polypropylene or propylene copolymer based on the total weight of the composition. The compositions were then each in turn doctored onto a flat smooth aluminium sheet using a Meyer bar as described above. The sheets were 300 mm long by 100 mm wide and had been treated by immersion in chromic acid. The doctored sheets were heated to 200° C. for 5 minutes in a circulating air oven and then allowed either to cool to room temperature or were quenched by dropping into cold (room temperature) water. In all cases the sheets were found to have a continuous smooth polypropylene coating having a thickness as shown in Table 4. The quenched coatings were glossy and transparent.

TABLE 4

| Example | Number of Example from which Composition was obtained | Thickness of Coating μm |
|---|---|---|
| 23 | 7 | 15 |
| 24 | 17 | 10 |

Quenched and unquenched sheets were made according to Examples 23 and 24 and were subjected to the following tests:
1. The T-bend test as defined by ASTM Test D 4145-83.
2. The Reverse Impact test as defined by ASTM Test D 2794-84.
3. The Cross-hatch Peel test for solvent resistance as described below.
4. The MEK Rub test as described below.

In all cases, the T-bend result was 0 and 2, the Reverse Impact force was not less than 1.4 kg.m, the peel resistance was 100 and the sample survived over 200 MEK rubs without the metal becoming visible. A T-bend result of 0 and 2 means that the first (i.e. the most severe) and subsequent bends showed no fractures visible to the unaided eye and the third and subsequent bends did not suffer from "pick-up", namely the ability of a coating to be removed by adhesive tape. The reverse impact force is the minimum force needed to separate the coating from the aluminium sheet.

The Cross-hatch Peel Test:

Ten parallel lines spaced 1.5 mm apart are scored through the coating to expose the metal. A second set of ten parallel lines spaced 1.5 mm part is likewise scored through the coating but at right angles to the first set so creating a matrix of 100 squares each having sides 1.5 mm long. A length of "Scotch" 610 transparent cellophane tape (supplied by the 3 M Company) is stuck onto the matrix and then rubbed hard with an erasing rubber to ensure good adhesion between the tape and the squares. The tape is then pulled away from the matrix and the number of squares remaining in the matrix is counted and quoted as the "peel resistance". A peel resistance of 100 (i.e. no squares removed) indicates a good adhesion between coating and metal surface.

The MEK Rub Test for Solvent Resistance:

In the MEK rub test, each coating was rubbed back and forth with a lambswool pad soaked in methyl ethyl ketone (MEK). After a number of back and forth rubs, the coated surface became visible through the coating when viewed through an optical microscope at ten fold magnification. The number of back and forth rubs needed for this to happen is recorded and is an indication of the solvent resistance of the coating.

We claim:

1. A process for the application of a thin crystalline polypropylene coating to a surface which process comprises
   a) providing across the surface a covering of a coating composition comprising particles of polypropylene having a number average diameter of from 0.1 to 25μm, and
   b) heating the composition to convert the particles into a coherent film
   wherein
   c) the particles comprise zones of amorphous polypropylene containing entrapped moderate solvent which solvent has the ability to depress by up to 80° C. the crystalline melting point (Tm) of the polypropylene when in a mixture consisting of 80 wt% of the solvent and 20 wt% of the polypropylene whereby on heating a coating having a thickness of less than 30μm can be obtained.

2. A process according to claim 1 wherein the composition also comprises an auxiliary solvent which has a high boiling point and has a plasticizing effect on the particles at a temperature of above 160° C.

3. A process according to claim 2 wherein the boiling point of the auxiliary solvent is at least 100° C. above the boiling point of the moderate solvent at 1 bar absolute.

4. A process according to claim 1 wherein the composition comprises a paste or dispersion of the particles in a liquid which does not destroy the particles at room temperature.

5. A process according to claim 1 wherein after application of the composition, the coating obtained is quenched by immersion into water having a temperature of below 50° C.

6. A process according to claim 1 wherein the composition has been made by a method which comprises
   a) heating a mixture comprising the moderate solvent for the polypropylene and at least 5 wt% of the polypropylene, the percentage being based on the combined weights of the moderate solvent and the polypropylene, to a temperature above the crystalline melting point (Tm) of the polypropylene when in the mixture and
   b) cooling the heated mixture under conditions such that solid/liquid phase separation occurs, whereupon there is produced a dispersion in moderate solvent of distinct particles of polypropylene.

7. A process according to claim 1 wherein the polypropylene contains a nucleant.

8. A process according to claim 7 wherein the nucleant is sodium benzoate, talc or a benzylidene sorbitol.

* * * * *